United States Patent [19]

Danilenko et al.

[11] Patent Number: 5,045,999
[45] Date of Patent: Sep. 3, 1991

[54] MULTI-FUNCTION TIMING SEQUENCER FOR DIFFERENT SPEED MAIN STORAGE UNITS

[75] Inventors: Michael Danilenko, West Saint Paul; David J. Tanglin, Anoka; Lawrence R. Fontaine, Minneapolis, all of Minn.

[73] Assignee: Unisys Corporation, Blue Bell, Pa.

[21] Appl. No.: 403,622

[22] Filed: Sep. 6, 1989

[51] Int. Cl.⁵ .............................................. G06F 1/04
[52] U.S. Cl. ..................................... 364/200; 377/39; 377/52
[58] Field of Search .................. 364/200, 900; 377/39, 377/82

[56] References Cited

U.S. PATENT DOCUMENTS 4,722,051 1/1988 Chattopadhya .................... 364/200
4,831,523 5/1989 Lewis et al. ....................... 364/200

Primary Examiner—Michael R. Fleming
Assistant Examiner—C. Shin
Attorney, Agent, or Firm—John W. Sowell; Glenn W. Bowen; Mark T. Starr

[57] ABSTRACT

A multi-function high speed sequencer is provided in a high speed instruction processor. The high speed sequencer comprises a first input latch coupled to logic signals for producing a first sequence signal. A chain of alternately clocked even and odd principal latches are coupled to the output of the first input latch to produce even and odd principal sequence signals for accessing a high speed MSU. A plurality of staging latches are coupled between the odd and the even principal latches for producing even and odd secondary sequence signals for accessing a slower speed MSU.

7 Claims, 6 Drawing Sheets

MULTI-FUNCTION TIMING SEQUENCER FOR DIFFERENT SPEED MAIN STORAGE UNITS

BACKGROUND OF THE INVENTION

1. Field of the Invention

The present invention relates to multi-function timing sequencers of the type employed in mainframe multi-processor systems. More particularly, the present invention relates to a novel timing sequencer having a plurality of selectable sequence signals adapted to coordinate the interface logic between an instruction processor and a main storage unit (MSU) having different access speeds.

2. Description of the Prior Art

Heretofore, timing circuits and sequencers were known and are classified in International Class HO3K, Subclass 21/40 and in U.S. Class 377, Subclasses 39, 52 and 70+.

Sequencers provide a sequence of clocked signals for coordinating a series of steps, functions or events in a computing system which together provide means for accomplishing specific functions or commands. In contrast thereto, timing generators or clock circuits provide a sequence of related time clocked signals and generally employ major and minor clocked cycles having subdivisions or phases which are for general purpose and are used throughout the computing system.

Heretofore, sequencers were designed to accomplish specific functions, such sequencers were usually constructed employing a plurality of flip-flops in a series chain which were clocked by timing signals to produce a series of signals used for gating functions. Sequencers have employed real time signals which are used as the input to decoders to further produce the desired gating signals but such structure is usually involved in more complex circuitry and logic delays.

U.S. Pat. No. 4,756,013 shows and describes a "Multi-Function Counter/Timer" which combines the above-mentioned counter, timing circuits with comparators, decoder qualification circuits and an output buffer register which results in a signal or a plurality of signals at the occurrence of a predetermined data event. Such timers are not sequencers and require more complex circuitry than sequencers.

It would be desirable to provide a multi-function sequencer which employs the minimum circuitry and minimum logic delays for use in a high speed mainframe multi-processor computing system.

SUMMARY OF THE INVENTION

It is a principal object of the present invention to provide a novel multi-function high speed sequencer.

It is another principal object of the present invention to provide a high speed multi-function sequencer having a plurality of latches arranged in a chain having both series and parallel outputs.

It is another principal object of the present invention to provide a multi-function sequencer having high speed AND/OR logic circuitry coupled between odd and even principal sequencer latches.

It is a general object of the present invention to provide a single sequencer for producing plural different desired sequencer signals.

It is another general object of the present invention to provide a novel sequencer for producing a series of primary sequence signals and a series of staging or secondary sequence signals.

It is yet another general object of the present invention to provide a multi-function sequencer for producing a plurality of selectable sequencer signals for accessing a high speed or a low speed MSU.

According to these and other objects of the present invention there is provided a novel sequencer having an input latch with inputs coupled to a start signal and a MSU identifying signal for producing an output signal indicative of the first sequence signal. The output of the input latch is coupled to a chain of alternately clocked even and odd principal latches for producing even and odd sequence signals and includes a plurality of staging latches coupled between said odd and even principal latches for producing even and odd secondary sequence signals for accessing a slow speed MSU.

DESCRIPTION OF THE PREFERRED EMBODIMENT

Figure 1:
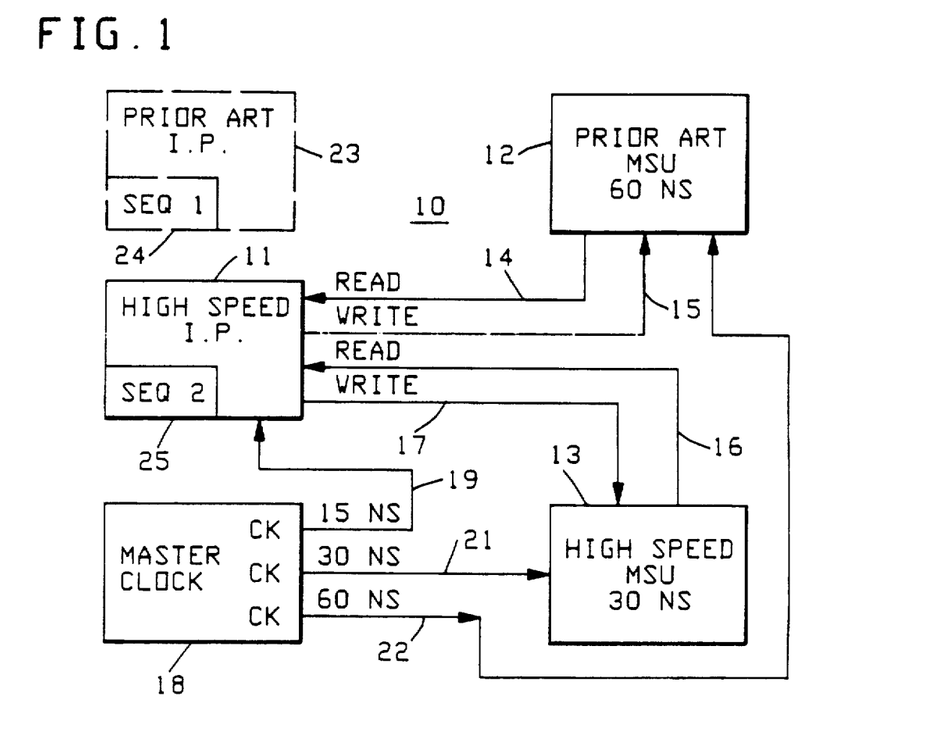
FIG. 1 is a schematic block diagram of the major components of the mainframe computing system of the type embodying the present invention multi-function sequencer.

Refer now to FIG. 1 showing a block diagram of a mainframe computing system 10 of the type having a high speed instruction processor 11 coupled to a low speed MSU 12 and a high speed MSU 13 by read/write busses 14-17. A high speed mainframe computing system also includes other components such as I/O processors and controllers coupled to the read/write bus and the components of the system, but for purposes of this invention, the components shown illustrate the environment in which the invention is operable. A master clock is provided for the system 10 and is shown having clock lines 19, 21 and 22, shown having 15 nanosecond, 30 nanosecond and 60 nanosecond clock lines, respectively coupled to the high speed instruction processor 11, the high speed MSU 13 and the low speed MSU 12.

Shown in phantom lines is a prior art instruction processor 23 of the type adapted to be coupled to the low speed MSU 12. The low speed instruction processor 23 was previously provided with a sequencer 24 which may be characterized as a low speed sequencer for sequencing the low speed MSU 12. However, when the prior art low speed instruction processor is replaced with a high speed instruction processor 11, it is desirable to be able to continue the use of the low speed MSU 12 in the new configuration computing system. The normal high speed sequencer 25 which would be adapted to access the high speed MSU 13, is not properly adapted to access the low speed MSU 12 and a second sequencer 24 should be provided in the high speed instruction processor 11. In order to eliminate the requirement for duplicate sequencers 24 and 25 in the new high speed computing system, the novel sequencer 25 will provide both a high speed and a low speed sequencer as will be explained in more detail hereinafter.

In the preferred embodiment of the present invention, either a high speed MSU 13 or a low speed MSU 12 is physically connected to a high speed IP 11 at any one time, thus, the configuration shown in FIG. 1 is for purposes of explanation only.

Figure 2:
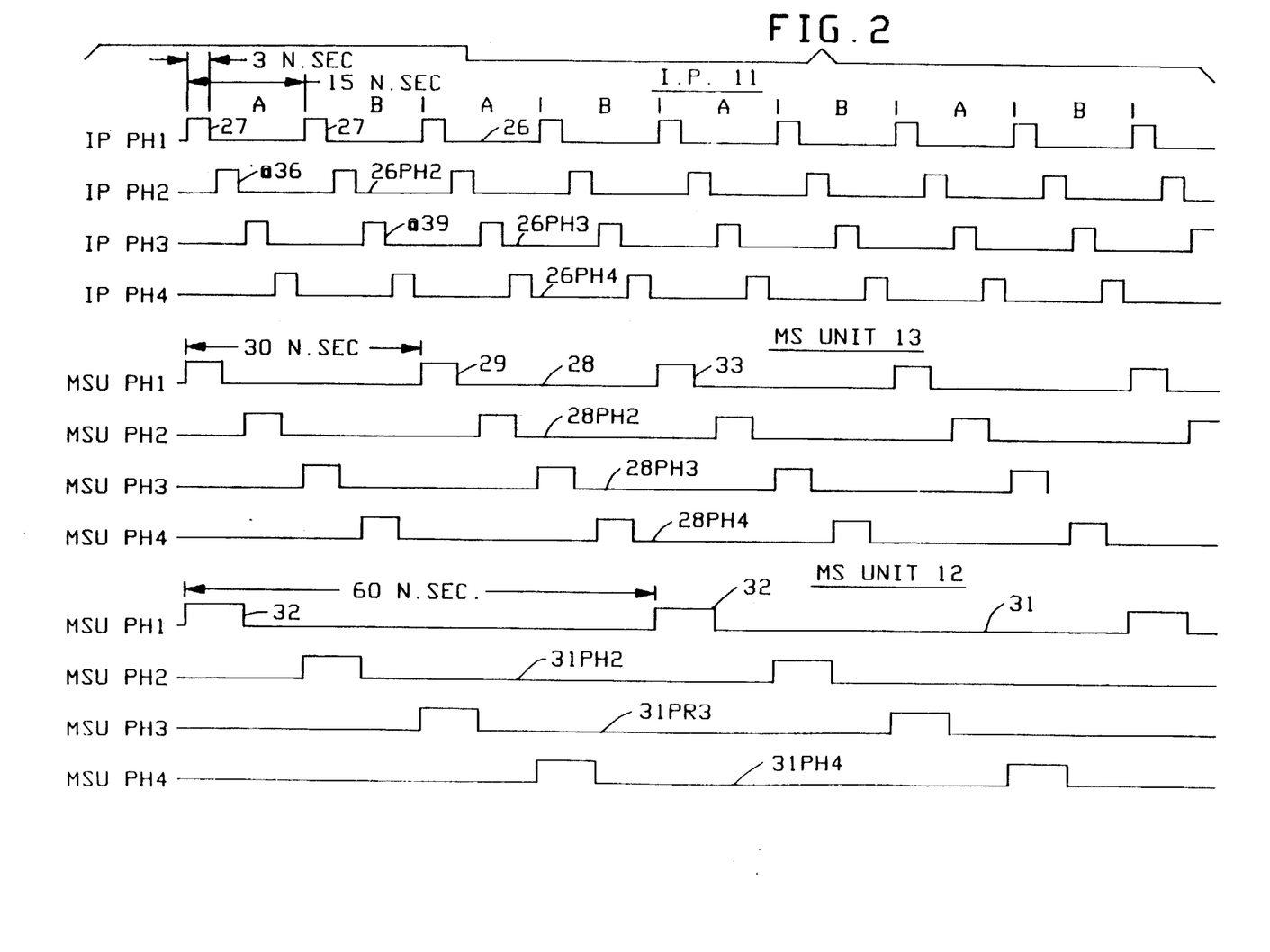
FIG. 2 is a timing diagram of the signals in the master clock used to generate principal (or primary) and staging (or secondary) sequencing signals.

Refer now to FIG. 2 showing a timing diagram of the master clock signals which will be employed to generate the primary and secondary sequencing signals. Waveform 26 is shown having a plurality of leading edge pulses 27, going high at the start of a monocycle A and a monocycle B for a duration of approximately 3 nanoseconds and wherein the A and B major and minor cycles comprise 15 nanoseconds each. These four phase signals are provided on line 19 from the master clock to the high speed instruction processor and are employed to clock the latches and logic circuitry in the sequencer.

Waveform 28 is shown having a plurality of leading edge pulses 29, 33 of approximately 5 nanoseconds duration which define a 30 nanosecond machine cycle for the high speed or 30 nanosecond main storage unit. Each of the pulses 29 in phases 2 through 4 all occurred during the 30 nanosecond machine cycle and terminates slightly before the leading edge of the pulses 29 of the next following 30 nanosecond machine cycle.

In similar manner, waveform 31 is shown having a leading edge pulse 32 which define a 60 nanosecond machine cycle and having pulses 32 in phases 2 through 4 which terminate before the end of the 60 nanosecond machine cycle and prior to the start of pulse 33 defining the start of the third machine cycle of the high speed main storage unit. Further, it will be noted that the pulses of the four phases of the high speed and low speed machine cycles need not be exact subdivisions of the high speed and low speed machine cycles but may be distinctly separated and terminated well before the end of the cycle so as to coordinate the phases with the operation of the main storage units or the components to which they are coupled.

Figure 3:
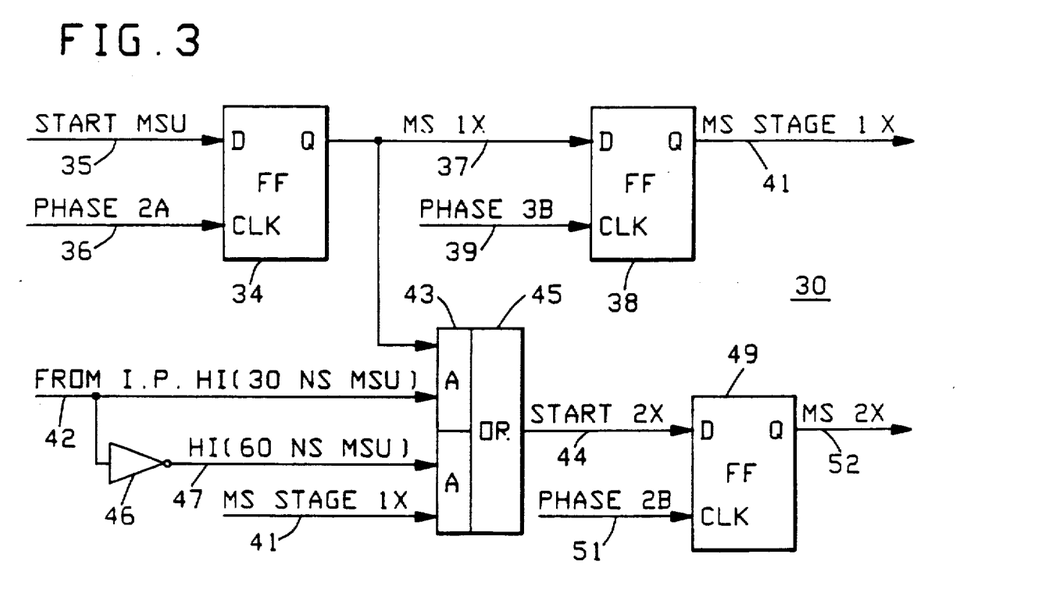
FIGS. 3, 4 and 5 are each logic block diagrams of the latches and gating circuits employed to produce the desired multi-function sequencing signals.

Refer now to FIG. 3 showing a logic block diagram of the latches and gating circuits of a preferred embodiment sequencer 30 having an input latch 34. Input latch 34 is shown having a start MSU signal on line 35 which is generated at the instruction processor 11 and is employed as a start signal for both the high speed and low speed MSUs 12 and 13. Input latch 34 is clocked by a phase two-pulse occurring during the monocycle A on line 36. The output from the Q side of latch 34 is employed as the principal or primary first sequencing signal 1X on line 37. The 1X primary sequencing signal on line 37 is applied to the data side of latch 38 which is clocked by a phase 3 pulse on line 39 occurring during the B monocycle as shown in FIG. 2 to produce the first secondary or stage sequencing signal 1X on line 41. The phase 2A signal on line 36 and the phase 3B signal on line 39 have been included on FIG. 2. The instruction processor 11 produces a high signal on line 42 for running a high speed MSU sequence. The high speed sequence signal on line 42 is applied to AND gate 43 along with the MS1X signal on line 37 to produce a start 2X signal on line 44 from the output of OR gate 45. The high speed MSU indicator signal on line 42 is applied to the input of inverter 46 to produce a high indicator signal on line 47 when the high indicator signal on line 42 is low. Thus, the indicator signal on line 47, when high, is used as an indicator for a slow speed memory sequence. The low speed indicator sequence signal on line 47 and a stage (or secondary) 1X signal on line 41 is applied to AND gate 48 and produces an output signal via OR gate 45 on start 2X line 44 when a low speed sequence of signals is indicated. The start 2X signal on line 44 is applied to the data side of latch 49 along with a phase 2B clock signal on line 51 to produce the desired primary 2X sequence signal on line 52.

Figure 4:
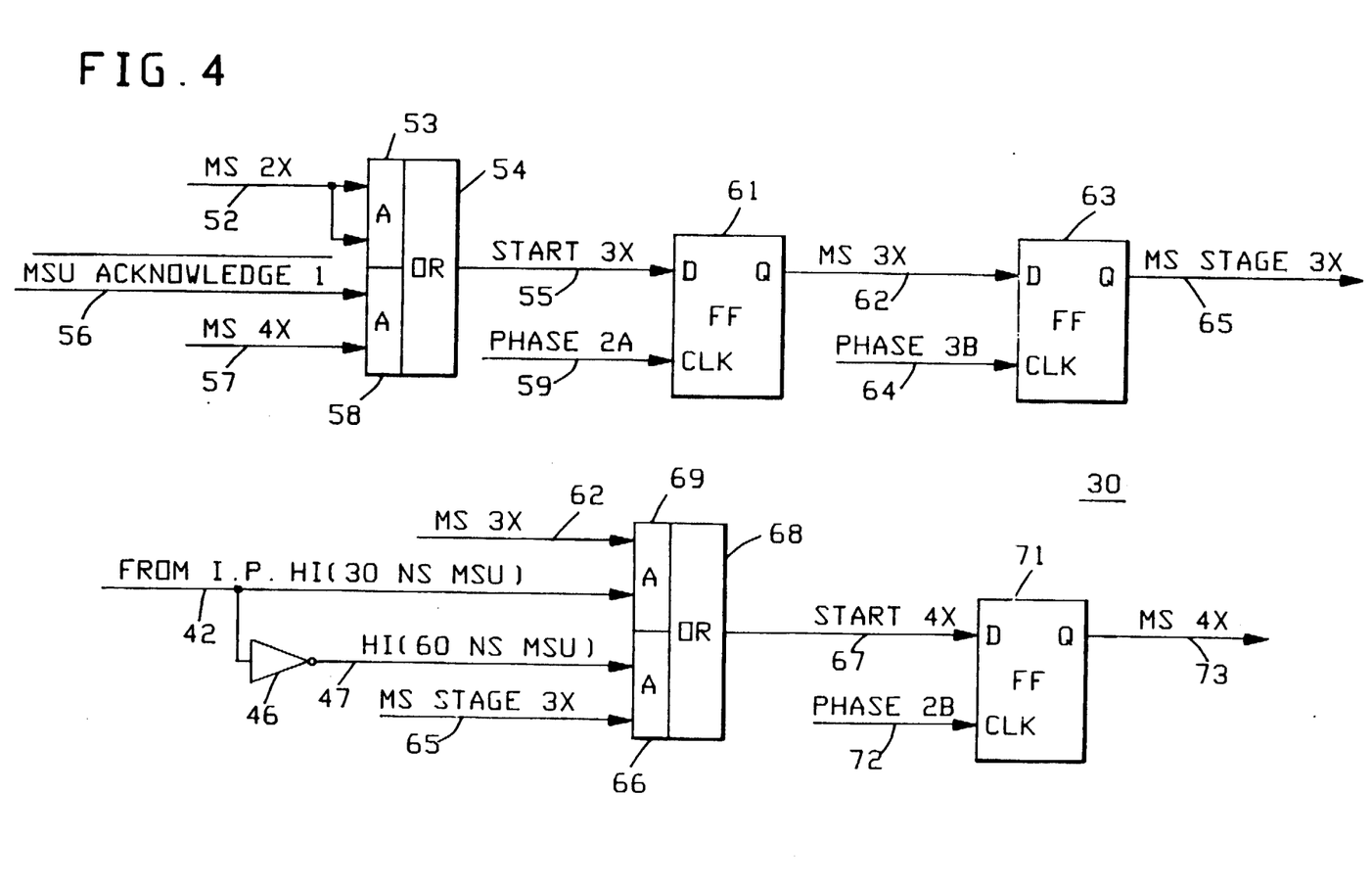

The high speed sequence signal 2X on line 52 is shown in FIG. 4 being applied to both input sides of AND gate 53 to produce a start 3X primary signal at the output of OR gate 54 on line 55.

A NOT MSU acknowledge 1 signal on line 56 and a primary MS4X signal on line 57 is applied to AND gate 58 and via OR gate 54 produces a start 3X signal at the output on line 55. It will be noted that the MS2X signal, when high, is capable of producing the start 3X signal on line 55, however, the start 3X signal may also be produced by either the high speed or the low speed MSU whose sequence is active. If the request into the MSU from the instruction processor is immediately acknowledged, there would be no wait and the NOT MSU acknowledge signal on line 56 would not be required. The circuitry shown permits the logic circuit to loop from a 4X sequence back to a 3X sequence until an acknowledge 1 signal is received from the MSU, as will be explained hereinafter. The phase 2A signal on line 59 is employed to clock the start 3X signal on line 55 through flip-flop 61 to produce the MS3X signal (or primary sequence signal) on line 62. It will be noted that the logic gating circuitry which produces the start 3X signal on line 55 always comes through immediately at the occurrence of a MS2X signal without delay but when being produced by the gating of the MS4X signal on line 57 will generate a new start 3X signal which occurs after the MS4X signal, thus closing the 4X to 3X loop until an acknowledge 1 signal is received from a busy MSU.

The MS3X signal at the output of latch 61 on line 62 is applied to the data side of latch 63 along with a phase 3B signal on line 64 to produce the MS stage 3X signal on line 65. The secondary or low speed MS stage 3X signal on line 65 is applied to AND gate 66 along with the high indicator signal on line 47, indicative of the low speed MSU sequence, to produce an output signal on line 67 from OR gate 68. Similarly, the aforementioned primary 3X sequencing signal on line 62 is applied to AND gate 69 along with the high speed MSU indicator signal on line 42 to produce a start 4X signal on line 67. The start 4X signal on line 67 is applied to latch 71 along with the phase 2B signal on line 72 to produce the primary MS4X signal on line 73.

Figure 5:
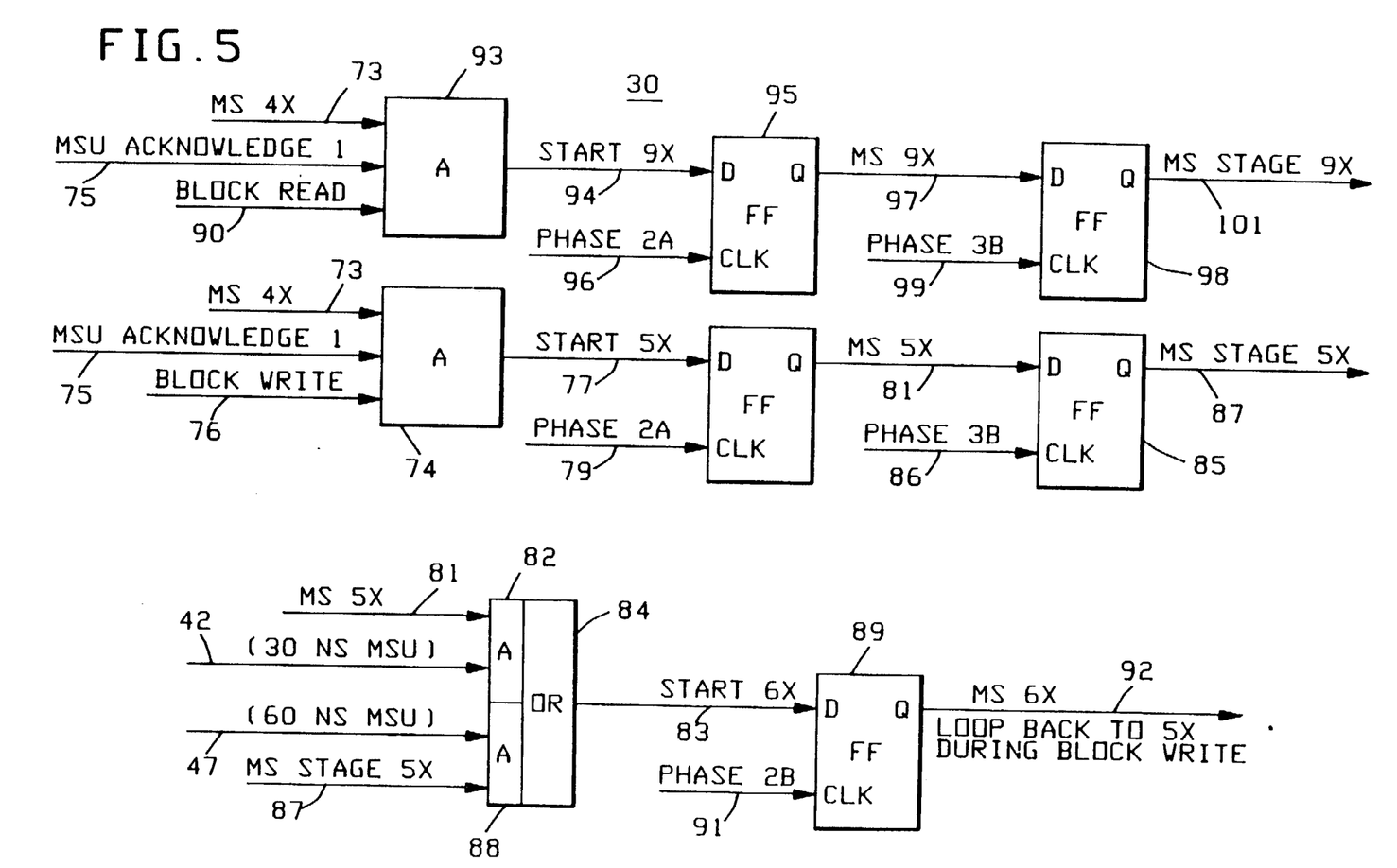

Refer now to FIG. 5 showing the primary MS4X signal on line 73 being applied to a three input AND gate 74 along with the high MSU acknowledge 1 signal on line 75 and with a block write signal on line 76 to produce a start 5X signal on line 77. The start 5X signal on line 77 is applied to the data side of latch 78 along with a phase 2A input clock signal on line 79 to produce the primary MS5X signal on line 81.

The primary MS5X signal on line 81 is applied to AND gate 82 along with a high speed MSU indicator signal on line 42 to produce an output signal on line 83 from OR gate 84. The output of latch 78 on line 81 is also applied to a latch 85 along with a phase 3B signal on line 86 to produce a stage MS5X signal on line 87 which is applied to the input of AND gate 88 along with a low speed MSU indicator signal on line 47 to produce the start 6X signal on line 83. The start 6X signal on line 83 is applied to latch 89 along with a phase 2B clock signal on line 91 to produce the desired primary MS6X signal on line 92.

In similar manner, a block read signal on line 90, a MS4X signal on line 73 and the MS acknowledge 1 signal on line 75 is applied to three input AND gate 93 to produce a start 9X output on line 94. The start 9X signal on line 94 is applied to the data side of latch 95 along with a phase 2A input signal on line 96 to clock the output signal on line 97. The primary MS9X signal on line 97 is applied as a data input to latch 98 along with a phase 3B signal on line 99 to produce the desired secondary MS stage 9X signal on line 101. The manner in which the aforementioned primary and secondary sequencing signals will be employed to read and write information from an MSU will be explained hereinafter.

Figure 6:
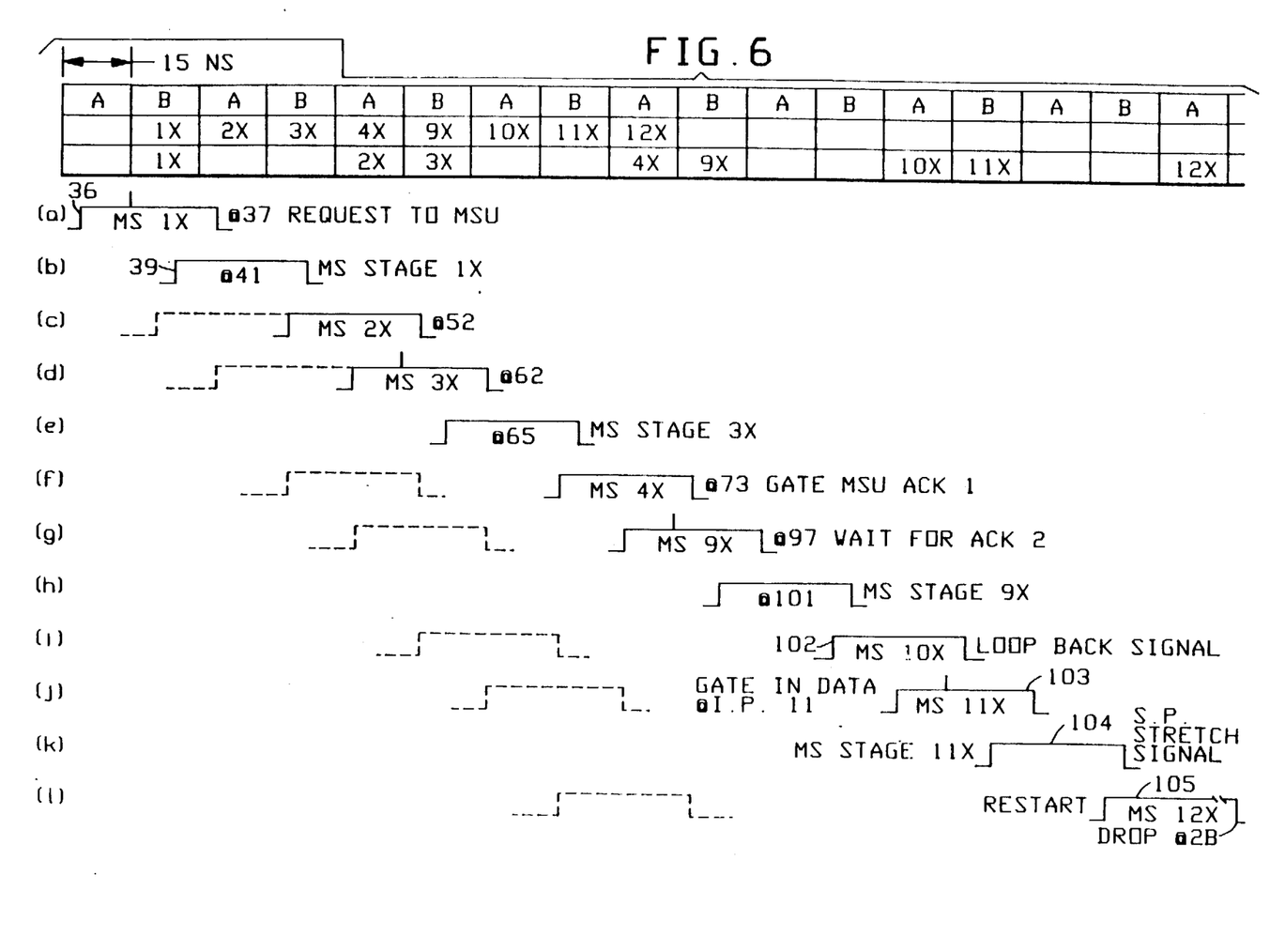
FIG. 6 comprises a logic chart of the primary sequencing gating signals and the waveforms produced by the latches and gating circuits of FIGS. 3-5 used to read a block of data from a high speed or a low speed main storage unit.

Refer now to FIG. 6 showing a logic block of the aforementioned primary and secondary gating signals and the waveforms produced by the latches of FIGS. 3-5 which are used to read a block of information from a main storage unit. The waveform chart at the top of FIG. 6(a) shows the leading edge of the MS1X signal which is generated on line 37 of FIG. 3 and which was produced by the leading edge of the phase 2A signal on line 36 during the first monocycle or cycle A shown in FIG. 2. The MS1X signal starts at the first phase 2 of a monocycle A and drops or terminates at the second phase 2 of a monocycle A. The MS1X signal shown in FIG. 6(a) is employed to initiate a request to the MSU to be accessed. In similar manner, the 60 nanoseconds MS stage 1X signal produced on line 41 is shown being initiated at phase 3B by the signal on line 39 of FIG. 3 and terminates two monocycles later at phase 3B. The MS2X signal at FIG. 6(c) is produced on line 52 is raised by the first phase 2B signal on line 51 and terminated at the next following phase 2B signal. Similarly, the primary MS3X signal FIG. 6(d) and secondary MS stage 3X signal FIG. 6(e) on lines 62 and 65 are produced and terminated at respective phase 2A and 3B by signals on lines 59 and 64 as explained hereinbefore. The signals on lines 41, 52, 62 and 65 are used in the logic circuitry shown in FIGS. 3-5 and are also employed internally in the instruction processor as stretch signals or logic signals and do not require a detailed explanation herein. The MS4X signal FIG. 6(f) produced on line 73 is generated at phase 2B time and terminates 2 monocycles later at phase 2B and is used to gate the MSU acknowledge 1 signal. The MS9X signal FIG. 6(g) on line 97 is raised at phase 2A time and is terminated two monocycles later at phase 2A. This signal is employed during the instruction processor wait for the acknowledge 2 signal. The acknowledge 2 signal informs the instruction processor 11 that data on the read bus will be forthcoming.

The MS stage 9X signal FIG. 6(h) produced on line 101 is a stretch signal and the MS10X signal FIG. 6(i) is used as a loop back signal similar to the 4X signal as was explained hereinbefore with reference to the logic circuitry at AND gate 58 of FIG. 4. The MS 11X signal 103 FIG. 6(j) is produced at the output of a latch (not shown) having a start 11X input signal to produce a gating signal for gating the data into the instruction processor 11. The MS stage 11X signal 104 FIG. 6(h) is generated by the MS11X signal being gated through a latch (not shown) during phase 3B as explained hereinbefore and is used as a slow speed stretch signal. The MS12X signal 105 FIG. 6(l) is employed as the restart or loop back signal to generate the next following MS11X signal sequence when reading a block of data into the instruction processor. It will be understood that the signals 102-105 are not shown on the logic circuitry FIGS. 3-5 but are generated by an identical latch circuitry shown and explained on FIG. 5.

Figure 7:
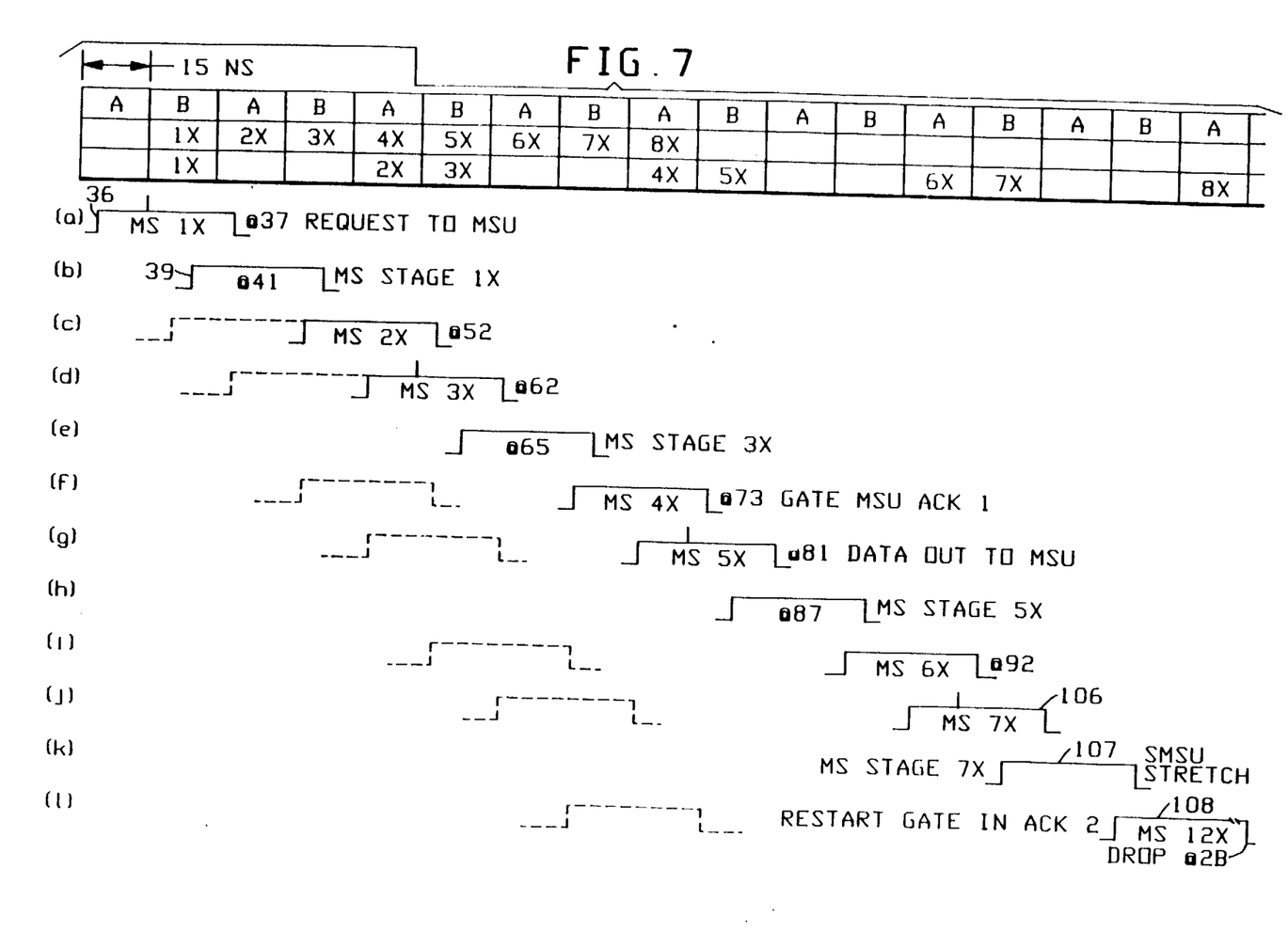
FIG. 7 is a logic chart of the primary sequence gating signals and the waveforms produced by the latches of FIGS. 3-5 used to write a block a data in a high speed MSU or a low speed MSU.

Refer now to FIG. 7 showing a logic chart for the primary and secondary sequence gating signals which are used to generate signals employed to write a block of data. The MS1X to MS4X signals shown on FIG. 7(a) to 7(f) are identical to the signals produced on lines 37, 41, 52, 62, 65 and 73, explained hereinbefore, and are employed for the same gating logic circuitry. The FIG. 7(g) to 7(l) signals which follow are shown on FIG. 5 starting with the MS5X signal on line 81 which is employed to gate the data out to the MSU being accessed. As explained hereinbefore, the primary MSX signals are raised at a phase 2A time and dropped on the next following phase 2A time. Similarly, the MS stage 5X signal on line 87 is raised at phase 3B time and dropped or lowered at the next following phase 3B time. The MS5X signal at FIG. 7(g) on line 87 is a stretch signal. Similarly, the MS6X signal at line 92 is a stretch signal. The MS7X signal, which is produced from the MS6X signal shown at waveform 106, is employed to generate the MS stage 7X signal 107 employed as a stretch signal for the slow speed MSU. The MS8X signal 108 FIG. 7(l) is employed as a restart signal and is used as a loop back signal while waiting for an acknowledge 2 signal, thus, is employed to gate in acknowledge 2. In similar manner, the MS6X signal on line 92 shown in FIG. 5 is employed as a loop back signal to the start 5X logic during block write operations which require more than two monocycles.

Having explained how a novel multi-function sequencer may be produced using high speed latch circuitry, it will be understood that the sequencer is a part of the high speed instruction processor which employs a 15 nanosecond clock divided into four phases. Thus, the sequencer shown in FIGS. 3-5 is implemented in high speed logic having decision signals which may be employed to gate-in or gate-out information approximately every 4 nanoseconds. In contrast thereto, the slow speed memory 12 shown in FIG. 1 requires approximately 250-300 nanoseconds before a first word is accessed after a read request is entered. Thereafter, double words comprising 72 bits of data may be accessed every 60 nanoseconds in blocks of words which usually comprise eight words per block. The high speed MSU 13 operates at least twice as fast and can perform a write operation during a 150 nanosecond cycle. The present invention permits the fastest possible access time to a slow speed MSU as well as high speed access to the high speed MSU without slowing down the logic circuitry of the high speed instruction processor. Knowing that the slow speed MSUs are only slow by relative terms, it will be appreciated that such memories cost hundreds of thousands of dollars and their life may be extended by providing proper access sequencing circuits even though the slow speed instruction processor for which it was originally designed may be obsolete.

What is claimed is:

1. A multi-function timing sequencer of the type employed in high speed computing systems, comprising:
   said computing system having a plurality of at least one slow and one fast speed main storage units (MSU) connected to processor means by read and write buses,
   said computer system being adapted to be connected to MSUs having different access times,
   a multi-function timing sequencer in said procesor means for producing a fast sequence and a slow sequence of MSU enabling singals,
   master clock means coupled to said MSUs, said processor means to said multi-function sequencer,
   logic means in said processor means for raising a start signal and a signal identifying one of said fast or said slow speed MSUs to be accessed,
   said multi-function sequencer having an input coupled to said start signal and to said MSU identifying signal for producing an odd and an even sequence of 1X to NX signals,
   said multi-function sequencer comprising a plurality of series connected odd and even principal latches 1X to NX for producing said 1X to NX sequencer signals to be employed by said processor logic means for accessing an identified high speed MSU to be accessed, and
   said multi-function sequencer further having a plurality of staging latches, each being coupled between one of said odd and said even principal latches for producing odd and even secondary sequence signals to be employed by said processor logic means for accessing a slow speed MSU.

2. A multi-function timing sequencer as set forth in claim 1 wherein said principal latches provide a plurality of principal sequence X timing signals.

3. A multi-function timing sequencer as set forth in claim 1 wherein said staging latches provide a plurality of secondary sequence stage X timing signals.

4. A multi-function timing sequencer as set forth in claim 2 which further comprises AND/OR gating means connected between said odd and said even primary latches to produce the next principal sequence X timing signals.

5. A multi-function timing sequencer as set forth in claim 3 which further comprises AND/OR gating means connected between the odd staging latches and the even principal latches to produce the next secondary sequence stage X timing signals.

6. A multi-function timing sequencer as set forth in claim 2 which further comprises AND gating means having a 4X input, a MSU acknowledge input and a block write signal input to produce a start 5X write sequence signal coupled to the input of the 5X principal latch.

7. A multi-function timing sequencer as set forth in claim 6 which further comprises AND gating means having a 4X input signal, a MSU acknowledge signal and a block read input signal to produce a start 9X read output signal coupled to the input of the 9X principal latch.